United States Patent [19]

Hoh

[11] 4,275,181

[45] Jun. 23, 1981

[54] CURABLE BLENDS OF CHLOROPRENE POLYMER AND ETHYLENE COPOLYMER

[75] Inventory: George L-K. Hoh, Wilmington, Del.

[73] Assignee: E. I. Du Pont de Nemours and Company, Wilmington, Del.

[21] Appl. No.: 98,973

[22] Filed: Nov. 30, 1979

Related U.S. Application Data

[63] Continuation of Ser. No. 937,726, Aug. 29, 1978, abandoned.

[51] Int. Cl.$^3$ .................... C08L 11/00; C08L 81/00
[52] U.S. Cl. .................................. 525/189; 525/185; 525/190
[58] Field of Search .................. 525/185, 189, 190

[56] References Cited

U.S. PATENT DOCUMENTS

| | | | |
|---|---|---|---|
| 2,910,451 | 10/1959 | Cantwell | 525/185 |
| 3,684,778 | 8/1972 | Hammer | 525/57 |
| 3,780,140 | 12/1973 | Hammer | 525/198 |

*Primary Examiner*—J. Ziegler

[57] ABSTRACT

Curable blends of chloroprene polymers are obtained by modification with ethylene/carbon monoxide or sulfur dioxide copolymers containing an additional softening copolymerizable comonomer such as vinyl esters, alkyl acrylates and methacrylates, alkyl vinyl ether, acrylonitrile, methacrylonitrile etc. Modification with the ethylene copolymers results in improved processing, increased resistance to ozone and reduced cost.

11 Claims, No Drawings

CURABLE BLENDS OF CHLOROPRENE POLYMER AND ETHYLENE COPOLYMER

This is a continuation of application Ser. No. 937,726, filed Aug. 29, 1978, now abandoned.

BACKGROUND OF THE INVENTION

1. Field of the Invention

This invention relates to curable blends and more specifically, it relates to improved curable blends of chloroprene polymer and ethylene copolymer.

2. Description of the Prior Art

Elastomers are frequently compounded with softeners and plasticizers to extend their applicability to different end uses. Many of these softeners are liquids which can volatilize on exposure of the compound to elevated temperatures or can be extracted when the compound is exposed to solvents or oils. More permanent polymeric liquid plasticizers are relatively expensive.

Research Disclosure No. 13816, dated October, 1975, discloses that the oil resistance of chlorosulfonated polyethylene was found to be significantly improved for blends in which a terpolymer (30–45 wt. % terpolymer based on the elastomer) of ethylene/carbon monoxide/vinyl acetate was used in place of ethylene/vinyl acetate copolymer. It is also stated therein that sealants with excellent tack and rubberiness were obtained with blends of an ethylene/carbon monoxide/vinyl acetate terpolymer with butyl rubber.

U.S. Pat. No. 3,780,140 discloses terpolymers of ethylene/carbon monoxide/termonomer and blends of same with a compatible amount of at least one solid organic polymer. Various termonomers are disclosed, such as unsaturated mono- and dicarboxylic acids, esters of such acids, vinyl esters of saturated carboxylic acids, vinyl alkyl ethers, acrylonitrile, etc. Solid organic polymers are disclosed to have preferably polar characteristics in order to obtain compatibility on a molecular scale. Such polymers can be polyamides; cellulose derived polymers; vinyl halide polymers; alpha-olefin based polymers such as polyethylene, polypropylene, chlorosulfonated polyethylene; ethylene-vinyl ester copolymers; polymers of styrene; polymers of acrylonitrile and copolymers of at least 40% acrylonitrile and other ethylenically unsaturated comonomers such as vinyl acetate, vinyl chloride and isobutylene; acrylics, polyesters; polyurethanes; polycarbonates; phenolics; polysulfones; epoxy resin; chlorinated polyethers; alkyd resins; acetal resins; ABS resins; silicone resins; tars; waxes; etc.

U.S. Pat. No. 2,495,286 discloses copolymers of ethylene and carbon monoxide with one or more additional polymerizable organic compound such as other olefins, butadienes, vinyl and vinylidene compounds, vinyl esters, styrene, acrylic and methacrylic acids and their esters, etc.

U.S. Pat. No. 3,873,494 discloses curable blends and vulcanizates of 100 parts of an ethylene/alkyl acrylate or alkyl methacrylate copolymer or an ethylene/alkyl acrylate or methacrylate terpolymer wherein the termonomer among others can be carbon monoxide, with 1–30 parts of a butadiene/acrylonitrile polymer. The termonomer is present in an amount not higher than about 10 wt. percent of the terpolymer.

SUMMARY OF THE INVENTION

According to the present invention there is provided a curable blend of (a) 100 parts of a chloroprene polymer and (b) about 3–100 parts of an ethylene copolymer selected from the group consisting of ethylene/carbon monoxide/X and ethylene/sulfur dioxide/X copolymers, wherein comonomer X is (I) a vinyl ester of an alkanoic acid, the acid having 1 to 18 C atoms, (II) an alkyl acrylate or methacrylate, the alkyl group having 1 to 18 C atoms, (III) an alkyl vinyl ether, the alkyl group having 1 to 4 C atoms, (IV) acrylonitrile or methacrylonitrile, or combinations of the above comonomers, the ethylene copolymer containing about 3–25 weight % of carbon monoxide or sulfur dioxide, about 10–65 weight % of comonomer X, and about 30–75 weight % of ethylene.

Further provided according to the present invention are compositions comprising the above curable blends combined with peroxide or sulfur curing system.

Still further provided according to the present invention are vulcanized products obtained by heating the combination of the above indicated curable blends and peroxide or sulfur curing systems.

DETAILED DESCRIPTION OF THE INVENTION

It has been found that the modification of curable blends of chloroprene polymers with an ethylene/carbon monoxide or sulfur dioxide copolymer containing at least one additional softening copolymerizable comonomer such as a vinyl ester, alkyl acrylate or methacrylate, acrylonitrile, etc., results in vulcanizates with improved processing, increased resistance to ozone, and reduced cost.

As a result of the above indicated improved characteristics, these modified vulcanizates can be employed in extruded shapes, such as tubing, gasketing, and electrical cable coverings; in composite structures such as fabric-reinforced hose, belting, and coated sheet; in shoe soling compounds, including cellular materials; and miscellaneous molded goods such as seals and O-rings.

The solid chloroprene polymer (neoprene) which is the main component of the blends of the present invention is a well known material. It can be made, for example, by emulsion polymerization using a free-radical catalyst. Several publications give extensive discussions of this technology, including see article titled "Polychloroprene Rubber," by P. R. Johnson, in "Rubber Chemistry and Technology," Vol. 49, No. 3, July-August, 1976; "Encyclopedia of Polymer Science and Technology," Vol. 3; "The Neoprenes," by R. M. Murray and D. C. Thompson (Elastomer Chemicals Department, Du Pont Company, trade literature). The disclosure of these publications is hereby incorporated by reference. In addition to homopolymers of chloroprene, copolymers, particularly those with 2,3-dichloro-1,3-butadiene, are useful in the compositions of this invention. For practical purposes, suitable chloroprene polymers are available commercially.

The ethylene copolymer modifier of the present invention is an ethylene carbon monoxide or sulfur dioxide copolymer containing at least one additional softening copolymerizable comonomer such as (a) vinyl esters of an alkanoic acid, the acid having 1 to 18 carbon atoms, e.g., vinyl formate, vinyl acetate, and vinyl stearate, (b) alkyl acrylates or methacrylates, the alkyl group having 1 to 18 carbon atoms, e.g., methyl acrylate, methyl methacrylate, ethyl acrylate, ethyl methacrylate, ethylhexyl acrylate, and stearyl acrylate, (c) an alkyl vinyl ether, the alkyl group having 1 to 4 carbon atoms, (d) acrylonitrile, methacrylonitrile or combinations of the above comonomers.

The carbon monoxide or sulfur dioxide component of the ethylene copolymer of the present invention should be present in the amount of about 3–25 wt. %, preferably about 6–15 wt. %.

The additional softening copolymerizable comonomer component of the ethylene copolymer of the present invention can be present in about 10–65 wt. %, preferably about 20–35 wt. %.

The amount of ethylene in the copolymer should be about 30–75 weight %, preferably about 50 to 70 weight %.

In these copolymers, copolymerized carbon monoxide or sulfur dioxide confers a high degree of polarity to the polymer without unduly reducing the ethylene content of the polymer. For instance, 1 weight % of copolymerized carbon monoxide confers polarity to the polymer equivalent to 3 to 5 weight % of a representative comonomer X, e.g., vinyl acetate, methyl acrylate, or 2-ethylhexyl acrylate. This property is important for several reasons: (a) at relatively high ethylene content, such polymers have sufficient polarity to be compatible with the neoprene rubber, and (b) at a given level of polarity, copolymers containing copolymerized CO or $SO_2$ are less sticky than those which contain only ethylene and comonomer X and are thus more easily processed because of reduced sticking to the surfaces of processing equipment.

The amount of ethylene copolymer in the blends of the present invention is about 3–100 parts, preferably about 5–50 parts, per 100 parts of chloroprene polymer.

The chloroprene polymer and the ethylene copolymer can be mixed uniformly with any of the usual mixing devices such as a roll mill, extruder, Banbury mixer, or other internal mixing device which is capable of mixing the materials without undue heating of the mixture. Other compounding ingredients well-known and used in elastomer compounds can also be added. Solid additives include reinforcing agents, fillers, pigments, and resins. Examples of such materials are carbon black, silica, calcium carbonate and titanium dioxide, hydrocarbon resins, and phenolic resins. Liquid additives include processing oils and plasticizers, both monomeric and polymeric, and liquid neoprene rubber.

Other materials such as stabilizers, antioxidants, antiozonants, lubricants, release agents, and additives that improve certain properties of the compound can be added in minor proportions.

Vulcanization of the blends is accomplished by known means. The chemical vulcanizing agents can be added in a Banbury mixer, a roll mill, or other mixing device under conditions which avoid premature curing of the compound. While co-curing of the chloroprene polymer and the ethylene/carbon monoxide or sulfur dioxide copolymer ingredient of this composition may give superior properties, it is not an essential part of this invention.

Chemical agents usually employed for vulcanization of chloroprene polymers are satisfactory for curing the blends of the present invention.

Typical curing agents include combinations of zinc and magnesium oxides, alone or with organic accelerators; sulfur donor or sulfur/accelerator systems; and peroxides. Curing of neoprene rubber is known in the art. Previously cited references, plus Chapter 13 of "Rubber Technology," by Maurice Morton, second edition, contain discussions of this subject. In addition, commercial literature from the Elastomer Chemicals Department of Du Pont Company provide more detailed information. Pertinent bulletins include: "Curing Systems for Neoprene," Bulletin No. SD-235, Dec. 13, 1976; "Hexamethylenetetramine/TMTD/Polyethylene Glycol—A Nonthiourea Cure System for Neoprene," Bulletin SD-234, November 1976; "NA-22F—An Accelerator for Polychloroprene Rubber," No. 69, Bulletin E-17790. The disclosure of these publications is hereby incorporated by reference.

Polychloroprene polymers behave differently from other diene elastomers in curing reactions. The presence of the chlorine atom deactivates the double bonds of the polymer, limiting direct sulfur vulcanization. Also, allyl chloride structures in the polymer function as major crosslinking sites by reaction with metal oxides, which are a necessary part of cure systems, or with polyfunctional nitrogen compounds such as finely divided hexamethylene tetramine. Thioureas such as tetramethyl thiourea and especially ethylene thiourea are accelerators that permit shorter curing times and often yield vulcanizate properties not otherwise available by increasing curing time or temperature.

To improve processing safety, mercaptobenzothiazyl sulfide, tetraethylthiuram disulfide, or poly(ethylene oxide) glycol can be used as retarder-activators. The amounts of accelerator and retarder-activator can be varied over a wide range depending on the particular chemical composition, the accelerator, the retarder-activator, and the intended use of the vulcanizate. Generally, the amounts of accelerator and retarder-activator used will range from 0.2 to 4, preferably 0.5 to 2, parts per 100 parts of chloroprene polymer. Peroxide curing agents (100% active basis) are also employed in the same ranges of use.

The final composition is shaped by known means, such as extrusion, injection molding, compression molding, transfer molding, or calendering into a sheet or onto a substrate, and cured. Steam, hot fluid, or microwave heating can be used for their curing, generally at temperatures from about 100° to 210° C. for about 0.5 to 120 minutes.

The following examples are given for the purpose of illustrating the present invention; all parts and percentages are by weight unless otherwise specified.

EXAMPLES 1–3

These examples illustrate the use of nitrogen-containing compounds to accelerate the cure of neoprene rubber compositions modified with E/VA/CO or E/MA/CO copolymers. Compositions and properties are summarized in Table I. It should be noted that the compound of Example 2, modified with E/MA/CO, has greater scorch safety; and, while the ODR torque does not reach as high a level as that of the compound of Example 1 containing E/VA/CO, the tensile properties are superior and the compound is softer.

TABLE I

| MODIFIED NEOPRENE COMPOUNDS | | | |
|---|---|---|---|
| | Example | | |
| | 1 | 2 | 3 |
| Ingredients (parts by weight) | | | |
| "Neoprene" W[(1)] | 70 | 70 | 70 |
| E/26.6% MA/6.7% CO, 2.5 MI | — | 30 | — |

TABLE I-continued

MODIFIED NEOPRENE COMPOUNDS

| | Example 1 | Example 2 | Example 3 |
|---|---|---|---|
| E/23% VA/11% CO, 35 MI | 30 | — | 30 |
| SRF Black | 35 | 35 | 35 |
| Aromatic Processing Oil | 10 | 10 | — |
| Low Molecular-Weight Polyethylene | 2 | 2 | 2 |
| Magnesium Oxide | 3 | 3 | 4 |
| Zinc Oxide | 5 | 5 | 5 |
| Octylated Diphenylamine | 2 | 2 | 2 |
| Hexamethylene Tetramine/Binder dispersion (65/35) | 1.5 | 1.5 | 1.5 |
| Poly(Ethylene Oxide)Glycol, 4000 Mol. Wt. | 2 | 2 | 1 |
| Tetraethyl Thiuram Disulfide | 1 | 1 | — |
| Di-Orthotolyl Guanidine | — | — | 1 |
| Compound Properties | | | |
| Mooney Scorch @ 121° C., Time to 5-Point Rise, Min. | 21 | 30+ | 18 |
| ODR Torque @ 30 Min., 162° C., Lb.-In. | 62 | 35 | 74 |
| Cured 20 Min. @ 162° C. | | | |
| Tensile Strength, MPa | 13.6 | 14.4 | 14.5 |
| Elongation, % | 290 | 440 | 300 |
| Modulus @ 100% Stress, MPa | 3.4 | 1.8 | 4.3 |
| Shore A Hardness, points | 72 | 63 | 78 |

[1] polychloroprene available from E. I. du Pont de Nemours & Company, having a Mooney Viscosity of 50.

CONTROL EXAMPLE C1 AND EXAMPLE 4

These examples illustrate the utility of E/VA/CO copolymer in the modification of chloroprene polymer.

The recipes for these examples are as follows, in parts by weight: Binder, 100; SRF carbon black, 80; aromatic process oil, 30; octylated diphenylamine antioxidant, 2; low molecular-weight polyethylene, 2; stearic acid 0.5; di-ortho-tolyl guanidine, 0.75; tetramethyl thiuram monosulfide, 0.75; sulfur, 1.0; and zinc oxide, 5. In Control Example C1, the binder is 100 parts of chloroprene polymer ("Neoprene" WHV, 120 Mooney viscosity) and in Example 4, the binder is 75 parts of "Neoprene" WHV and 25 parts of the E/VA/CO copolymer of Example 1. The properties of the vulcanizates of these two compounds are shown in Table II. Benefits obtained by use of the E/VA/CO copolymer include reduced cost, improved processing, increased resistance to ozone, and reduced compression set. The binder of Example 4 was made up in the form of a masterbatch and an appropriate portion of the masterbatch was then used for each compounding.

TABLE II

NEOPRENE AND NEOPRENE-E/VA/CO VULCANIZATE PROPERTIES

| Properties | C1 | Example 4 |
|---|---|---|
| Mooney Viscosity, ML-4 | 76 | 56 |
| Mooney Scorch, Δ5, Minutes | >30 | 11 |
| Tensile Strength, MPa | 19.0 | 17.2 |
| Elongation, % | 330 | 270 |
| Shore A Hardness, Points | 71 | 79 |
| Compression Set, % (22 hrs. @ 100° C.) | 61 | 52 |
| Ozone Resistance (Bent Loop, 24 hrs. @ 100 pphm) | Cracked | Very Few Small Cracks |
| Molded Surface Rating | Good | Very Good |
| Tear Strength, Die "C" N/mm. | 42 | 35 |

CONTROL EXAMPLE C2 AND EXAMPLES 5-6

These examples are, respectively, a control example, a thiourea-accelerated thiuram cure system, and a peroxide cure system. All stocks contain SRF carbon black, 35 parts; low molecular-weight polyethylene lubricant, 2 parts; octylated diphenylamine antioxidant, 2 parts; magnesium oxide acid acceptor, 4 parts; and zinc oxide acid acceptor/activator, 5 parts. The different binder systems and curing agents employed in these examples are shown in Table III.

As shown by the data in Table III, the use of the E/VA/CO terpolymer in a neoprene compound gives a lower processing viscosity and a vulcanizate with lower tensile strength and higher hardness. With peroxide curing, scorch time is double that of a sulfur cure system for the modified compounds and is thus safer. The tensile strength, percent elongation, and compression set of the peroxide vulcanizate are superior to that of the sulfur vulcanizate.

TABLE III

COMPARISON OF SULFUR AND PEROXIDE CURE

| | Example C2 | Example 5 | Example 6 |
|---|---|---|---|
| Ingredients (parts by weight) | | | |
| "Neoprene" W | 100 | 70 | 70 |
| E/23.5%VA/11% CO, 35 MI | — | 30 | 30 |
| 2-Mercaptoimidazoline (ethylenethiourea)/Ethylene/propylene rubber dispersion (75/25) | 0.75 | 0.75 | — |
| Tetramethylenethiuram Monosulfide | 0.75 | 0.75 | — |
| α,α'-bis(butylperoxy) disopropylbenzene Burgess KE Clay (40/60) | — | — | 1.5 |
| SRF Black | 35 | 35 | 35 |
| Low molecular weight polyethylene | 2 | 2 | 2 |
| Magnesium Oxide | 4 | 4 | 4 |
| Zinc Oxide | 5 | 5 | 5 |
| Octylated Diphenylamine | 2 | 2 | 2 |
| Mooney Scorch, @ 121° C. | | | |
| Minimum Viscosity | 25 | 18 | 18 |
| Time to 5 pt. rise, min. | 16 | 20 | 40 |
| ODR Cure @ 162° C. (30 min.) | | | |
| Maximum Torque, Lb.-In. | 77 | 43 | 44 |
| Time to 90% of max., minutes | 3.5 | 5.0 | 5.5 |
| Cured Properties (162° C., 15 min.) | | | |
| Tensile Strength, MPa | 21.4 | 15.8 | 16.5 |
| Modulus @ 100% Stress, MPa | 2.9 | 3.4 | 3.1 |
| Elongation % | 430 | 430 | 470 |
| Shore A Hardness, Points | 68 | 77 | 76 |
| Compression Set (cured 162° C., 20 min.) 22 HR. @ 100° C., Method B of ASTM D395 % | 39 | 52 | 40 |

CONTROL EXAMPLE C3 AND EXAMPLES 7-8

All stocks contain 35 parts of SRF carbon black, 2 parts of low molecular weight polyethylene, 4 parts of magnesium oxide, 2 parts of octylated diphenylamine, 5 parts of zinc oxide, 1 part of poly(ethylene oxide) glycol, 1 part of tetraethylthiuram disulfide, and 1.5 parts of hexamethylene tetramine/binder dispersion (65/35). Additional ingredients in each compound are shown in Table IV with data on the properties of the blends and their vulcanizates. The use of E/VA/CO in compounds 7 and 8 shows again the surprising results that ozone resistance and resistance to ASTM #3 oil are improved over the base neoprene compound. The compound of Example 8, modified with dioctyl sebacate, a low-temperature plasticizer, shows good response. Improvement in both resistance to impact at low temperatures and to stiffening is obtained.

TABLE IV
COMPARISON OF PROCESSING OIL AND ESTER PLASTICIZER MODIFICATION

| | Example | | |
|---|---|---|---|
| | C3 | 7 | 8 |
| Ingredients (parts by weight) | | | |
| "Neoprene" W | 100 | 70 | 70 |
| E/23.5% VA/11% CO, 35 MI | — | 30 | 30 |
| Aromatic Processing Oil | 20 | 20 | — |
| Dioctyl Sebacate | — | — | 30 |
| SRF Black | 35 | 35 | 35 |
| Low molecular wt. polyethylene | 2 | 2 | 2 |
| Magnesium Oxide | 4 | 4 | 4 |
| Zinc Oxide | 5 | 5 | 5 |
| Octylated Diphenylamine | 2 | 2 | 2 |
| Hexamethylene Tetramine/Binder dispersion (65/35) | 1.5 | 1.5 | 1.5 |
| Poly(Ethylene Oxide)Glycol, 4000 Mol. Wt. | 1 | 1 | 1 |
| Tetraethyl Thiuram Disulfide | 1 | 1 | 1 |
| Mooney Scorch, @ 121° C. | | | |
| Minimum Viscosity | 12 | 8 | 5 |
| Time to 5 pt. rise, min. | 25 | 20 | 32 |
| ODR Cure, 162° C. (30 Min.) | | | |
| Maximum Torque, Lb.-In. | 48 | 56 | 39 |
| Time to 90% of max., minutes | 18 | 20 | 22 |
| Cured Properties (162° C., 20 min.) | | | |
| Tensile Strength, MPa | 17.9 | 13.1 | 10.3 |
| Modulus @ 100% Stress, MPa | 1.5 | 2.5 | 2.1 |
| Elongation, % | 500 | 290 | 280 |
| Shore A Hardness, Points | 52 | 62 | 56 |
| Compression Set (162° C., 25 min.) 22 Hr. @ 100° C., Method B of ASTM D 395 | | | |
| % | 29 | 40 | 47 |
| Ozone Exposure, 1ppm O₃, 30% Elongation, 4 days | | | |
| Surface Appearance | cracks | no cracks | no cracks |
| Properties Volume Increase, 70 Hr. @ 100° C., ASTM #3 Oil | | | |
| % | 77 | 60 | 54 |
| Oven Aged, 7 days @ 121° C. | | | |
| Tensile Strength, MPa | 12.8 | 12.8 | 9.3 |
| Elongation, % | 260 | 85 | 65 |
| Shore A Hardness, Points | 72 | 84 | 80 |
| Solenoid Brittleness Test | | | |
| Pass, °C. | −38 | −40 | −60 |
| Fail, °C. | −42 | −46 | −60 |
| Low Temp. Stiffening, ASTM D1043 | | | |
| Modulus, MPa @ 23.8° C. | 2.3 | 2.4 | 2.3 |
| −34.4° C. | 18.6 | 40.7 | 6.2 |
| −40.0° C. | 165.5 | 172.4 | 7.6 |
| −45.5° C. | — | — | 10.3 |
| −51.1° C. | — | — | 20.7 |

I claim:

1. An improved curable blend of chloroprene elastomer, with at least one compatible polymer wherein the improvement comprises said compatible polymer being about 5–100 parts of an ethylene copolymer per 100 parts of a chloroprene elastomer, said ethylene polymer being selected from the group consisting of ethylene/carbon monoxide/X and ethylene/sulfur dioxide/X copolymers, wherein comonomer X is (I) a vinyl ester of an alkanoic acid, the acid having 1 to 18 C atoms, (II) an alkyl acrylate or methacrylate, the alkyl group having 1 to 18 C atoms, (III) an alkyl vinyl ether, the alkyl group having 1 to 4 C atoms, (IV) acrylonitrile or methacrylonitrile, or combinations of the above comonomers, the ethylene copolymer containing about 3–25 weight % of carbon monoxide or sulfur dioxide, about 10–65 weight % of comonomer X, and about 30–75 weight % of ethylene, the vulcanizates of said curable blends of chloroprene having increased resistance to ozone without sacrificing resistance to oil.

2. The curable blend of claim 1 wherein the amount of ethylene copolymer is about 5–50 parts.

3. The curable blend of claim 2 wherein the amount of carbon monoxide or sulfur dioxide is about 6–15 weight %.

4. The curable blend of claim 3 wherein the amount of comonomer X is about 20–35 weight %.

5. The curable blend of claim 4 wherein the amount of ethylene is about 50–70 weight %.

6. The curable blend of claim 5 wherein comonomer X is vinyl acetate.

7. The curable blend of claim 5 wherein comonomer X is methyl acrylate.

8. The curable blend of claim 5 wherein the ethylene copolymer is ethylene/vinyl acetate/carbon monoxide terpolymer.

9. The curable blend of claim 5 wherein the ethylene copolymer is ethylene/methyl acrylate/carbon monoxide terpolymer.

10. A composition comprising the curable blend of claim 1, 5, 8 or 9 and a peroxide or sulfur curing system.

11. A vulcanized product obtained by heating the composition of claim 10 for about 0.5 to 120 minutes at about 100° to 210° C.

* * * * *